(12) United States Patent
Imai et al.

(10) Patent No.: US 6,825,610 B2
(45) Date of Patent: Nov. 30, 2004

(54) CARBON INK, ELECTRON-EMITTING ELEMENT, METHOD FOR MANUFACTURING AN ELECTRON-EMITTING ELEMENT AND IMAGE DISPLAY DEVICE

(75) Inventors: Kanji Imai, Takatsuki (JP); Kohji Matsuo, Kobe (JP); Tomohiro Sekiguchi, Nishinomiya (JP); Mitsunori Yokomakura, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/663,152

(22) Filed: Sep. 15, 2003

(65) Prior Publication Data

US 2004/0051433 A1 Mar. 18, 2004

Related U.S. Application Data

(62) Division of application No. 09/480,741, filed on Jan. 10, 2000, now Pat. No. 6,653,366.

(30) Foreign Application Priority Data

Jan. 11, 1999 (JP) .......................................... 11-003789

(51) Int. Cl.[7] .................................................. H01J 1/62
(52) U.S. Cl. ....................... 313/495; 313/309; 313/496; 313/497; 313/311; 445/24; 445/50; 445/51
(58) Field of Search ................. 313/309–311, 495–497, 313/336, 351; 445/24, 50, 51

(56) References Cited

U.S. PATENT DOCUMENTS 4,839,960 A  6/1989  Yokoi et al.
4,877,565 A  10/1989  Tani et al.
5,948,465 A  9/1999  Blanchet-Fincher et al.
6,129,602 A  10/2000  Yamanobe
6,239,547 B1  5/2001  Uemura et al.
6,299,785 B1  10/2001  Shimokawa et al.
6,409,567 B1  6/2002  Amey, Jr. et al.
6,486,609 B1 *  11/2002  Shiratori et al. ......... 315/169.3

FOREIGN PATENT DOCUMENTS

JP  10-12124  1/1998
JP  10-149760  6/1998
JP  10-199398  7/1998

OTHER PUBLICATIONS de Heer er at; "Electron Field Emitters Based on Carbon Nanotube Films"; Advanced Materials, DE, VCH Verlagsgesellschaft, Weinheim, vol. 9, No. 1, Jan. 1, 1997, pp 87–89.

* cited by examiner

Primary Examiner—Vip Patel
Assistant Examiner—Anthony Perry
(74) Attorney, Agent, or Firm—Merchant & Gould P.C.

(57) ABSTRACT

The invention presents a carbon ink with high electric field emission efficiency that can be applied in an inexpensive printing process suitable for mass production, an improved electron-emitting element for an image display device, and a method for manufacturing the electron-emitting element. The invention also presents an image display device with high image quality and efficiency using this electron-emitting element. The image display device includes a patterned conductor on a substrate, and electron-emitting elements made by applying, to predetermined positions of the conductor, a carbon ink made into a paste with an organic binder and a solvent, the ink comprising (i) carbon particles having a 6-membered carbon ring, and (ii) support particles for supporting the carbon particles, and firing the ink.

10 Claims, 11 Drawing Sheets

CARBON INK, ELECTRON-EMITTING ELEMENT, METHOD FOR MANUFACTURING AN ELECTRON-EMITTING ELEMENT AND IMAGE DISPLAY DEVICE This application is a divisional of application Ser. No. 09/480,741, filed Jan. 10, 2000, now U.S. Pat. No. 6,653,366, which application(s) are incorporated herein by reference.

BACKGROUND OF THE INVENTION

1. Field of the Invention

The present invention relates to an electron-emitting element emitting electrons utilizing the phenomenon of electric field electron emission, and to an image display device using such an electron-emitting element. More particularly, the present invention relates to a thin image display device used, for example, for audio-visual equipment.

2. Description of the Prior Art

Until now, mainly cathode ray tubes (CRTs) are used for displays (image display devices) such as color televisions or computer monitors. However recently, there is a need for ever smaller, lighter and thinner image display devices, and the development of new thinner image display devices is flourishing.

This situation has led to research and development activities for several types of thin image display devices, and of these, the development of liquid crystal displays and plasma displays is particularly thriving. Liquid crystal displays find application in many products, such as portable computers, portable televisions, video cameras, and car navigation systems. Plasma displays find application in products such as 20-inch or 40-inch large displays.

However, liquid crystal displays have the problem that their viewing angle is narrow, and their response times are slow, whereas plasma display devices have the problem that they can hardly attain high brilliance and their power consumption is large. As thin image display devices that solve these problems, image display devices utilizing the so-called "field emission" phenomenon, whereby electrons are emitted at regular temperatures in a vacuum, have had wide-spread attention (such devices are referred to as "FEDs" in the following). Such an FED is self-emitting, so that a broad viewing angle and a high brilliance can be attained. Moreover, its basic principle (using an electron beam to cause a phosphor to emit light) is the same as in conventional cathode ray tubes, so that an image with high color repeatability can be displayed naturally.

As the electron-emitting elements for the FED, Spindt-type microchip-type electron-emitting elements, surface-conducting elements formed on a metal thin film or an oxide thin film, and MIM-type (or similarly structured) electron-emitting elements have been proposed for example.

In recent years, carbon-based materials, such as diamond, graphite, DLC (diamond-like carbon), and carbon nanotubes have gained wide-spread attention as electron-emitting materials for making electron-emitting elements.

Such an electron-emitting element is disclosed, for example, in Japanese Patent Applications Tokkai Hei 10-149760 and Tokkai Hei 10-12124.

FIGS. 8 and 9 are schematic cross-sectional drawings of a first conventional electron-emitting element (see Tokkai Hei 10-149760). The electron-emitting element in FIG. 8 is made be applying purified carbon nanotubes 101 made by arc emission to a support substrate 102 made of a synthetic resin (FIG. 8A), and then applying a resist and forming a pattern in accordance with the layout of the electron-emitting portions 103 by lithography, so that electron-emitting portions 103 made of carbon nanotubes 101 are formed on the support substrate 102 (FIG. 8B). In this case, the carbon nanotubes 101 on the support substrate 102 lie one upon another like fallen trees, as shown in FIG. 9.

When an electric field is applied to the carbon nanotubes 101 patterned into an electron-emitting portion 103 in such an electron-emitting element, electrons are emitted by the carbon nanotubes 101.

FIG. 10 is a schematic cross-sectional drawing of a second conventional electron-emitting element (see same Tokkai Hei 10-149760). The electron-emitting element in FIG. 10 includes a support substrate 111, a cathode wiring layer 112 disposed on the support substrate 111, and an electron-emitting portion 116 disposed on the cathode wiring layer 112. The electron-emitting portion 116 includes a conductive convex portion 114 formed in a portion of a conductive material layer 113, and a plurality of carbon nanotubes 115 partially buried in the tip of the conductive convex portion 114.

The following is an explanation of a method for manufacturing this second conventional electron-emitting element. First, a substrate of a silicon single-crystal is prepared, and a female mold substrate for the conductive convex portion 114 is formed by anisotropic etching. Carbon nanotubes 115 are disposed in this concave portion, a conductive material such as tungsten is deposited on top of it by sputtering, and a conductive material for wiring is sputtered on top of that. Then, the female mold substrate is removed, resulting in an electron-emitting element as shown in FIG. 10.

In this electron-emitting element, the electron-emitting carbon nanotubes 115 are arranged at the tip of the conductive convex portion 114, where an electric field tends to concentrate, so that a large electric field can be generated with a small driving voltage, and the electron-emitting carbon nanotubes 115 emit electrons efficiently.

FIG. 11 is a schematic cross-sectional drawing of a third conventional electron-emitting element (Tokkai Hei 10-12124). The electron-emitting element shown in FIG. 11 is formed as follows. First, an aluminum film 122 is formed by, for example, vapor deposition on a flat glass substrate 121. Then, the aluminum film 122 is rinsed, and an insulating film 123 is formed by an anode oxidation process. After this process, the bottom portion of the pores 124 formed during the anode oxidation process are etched all the way to the aluminum film 122 by anisotropic RIE etching. In an electrocoloring process, a nickel metal catalyst 125 is buried in the pores 124, and successively a heating process is performed at 1150° C. in a mixed atmosphere of methane gas and hydrogen to generate and grow carbon nanotubes 126. With these steps, electron-emitting carbon nanotubes 126 can be orientationally aligned with high precision, and arranged to form an electron-emitting element with sharp tips.

With such an electron-emitting element, the carbon nanotubes 126 can be orientationally aligned into a shape with sharp tips, so that an electric field can be concentrated effectively at the electron-emitting material to attain an electron-emitting element with high efficiency.

However, the conventional electron-emitting element shown in FIG. 8 has the following problems. First of all, if carbon nanotubes 101 are applied to the support substrate 102 by a method such as printing, since the carbon nanotubes 101 have a rod-like longish molecular shape, they lie one upon another like fallen trees, as shown in FIG. 9, when attached to the support substrate 102. In this situation, the orientation of the electron-emitting carbon nanotubes 101 poses the problem that the tips, which are the most important for the electron emission, are partially buried. Thus, when a voltage is applied to the electron-emitting element, the electric field does not concentrate effectively, so that an efficient electron-emitting element is not attained. Moreover, forcing the carbon nanotubes 101 to assume an upright position with respect to the support substrate 102, by press-inserting or burying it is extraordinarily difficult to let each and every molecule of the countless carbon nanotubes 101 stand upright on the support substrate 102.

Moreover, in the conventional electron-emitting element shown in FIG. 10, with the manufacturing method described above, the carbon nanotubes 115 are arranged on a concave portion and a conductive material is sputtered on top of them, so that the carbon nanotubes 115 are buried inside the tip of the conductive convex portion 114. Thus, even when the electric field concentrates in the conductive convex portion 114, the electric field does not sufficiently concentrate on the carbon nanotubes 115 themselves, so that an effective electron-emitting element is not attained. Moreover, the step for forming the conductive convex portion 114 itself is complicated, and there is a limit to the size of the silicon substrate, so that this is not a process that can be performed inexpensively for large substrates. Moreover, it is difficult to suppress irregularities of the convex shape, and there are problems with regard to reliability and production cost.

Moreover, in the conventional electron-emitting element shown in FIG. 11, the carbon nanotubes 126 stand upright on the glass substrate 121, so that an electron emission due to an electric field concentration can be attained. However, since the source for this electron emission is buried in the insulating film 123, when the electron emission begins, the surface of the insulating film 123 starts to charge electrically, which changes the electric field, so that emission of electrons becomes unstable and an effective electron emission is not attained. Moreover, it is also possible to let the carbon nanotubes 126 protrude somewhat from the pores 124, but it is difficult to control the protrusion amount of the carbon nanotubes 126 during the step of molecule growth, and large variations occur easily. Moreover, since this step is performed at temperatures above 1000° C., there is the problem that regular glass sheets do not withstand such high temperatures, so that there are limitations with regard to the material and the size of the substrates, which leads to the same problems with regard to efficiency, reliability and costs as above.

SUMMARY OF THE INVENTION

With the aforementioned problems of the prior art in mind, and in consideration of favorable properties when being used for image display devices in particular, it is an object of the present invention to provide a carbon ink containing an electron-emitting component and an electron-emitting element, to which the carbon ink is applied in an inexpensive printing step suitable for mass production, the electron-emitting element having good electric field emission efficiency, being driven with low driving voltages, and being able to emit electrons even at a low degree of vacuum. It is a further object of the present invention to provide a method for manufacturing such an electron-emitting element. It is also an object of the present invention to provide an improved electron-emitting element used in an image display device.

It is another object of the present invention to provide a high-resolution image display device with high image quality and efficiency including such an improved electron-emitting element.

To realize these objects, an inventive carbon particle composition is provided. One embodiment of the present invention is an inventive carbon ink made into a paste with an organic binder and a solvent comprises carbon particles having a 6-membered carbon ring, and support particles for supporting the carbon particles.

An electron-emitting element in accordance with the present invention is made by applying, to predetermined positions of a conductor patterned onto a substrate, a carbon ink made into a paste with an organic binder and a solvent, the ink comprising (i) carbon particles having a 6-membered carbon ring, and (ii) support particles for supporting the carbon particles, and firing the ink. When the ink is applied to a substrate, the support particles support some of the carbon particles so as to stand in a substantially upright orientation with respect to the substrate. In this situation, the support particles contact the carbon particles only at portions of the surface of the carbon particles.

With the carbon ink and the electron-emitting element in accordance with the present invention, carbon particles having a 6-membered carbon ring and serving as an electron-emitting material are made into a paste with an organic binder and a solvent. Thus, they can be applied in specified positions and scope on a substrate or the cathode wiring, using an inexpensive method suitable for mass production, such as printing. Since, in this configuration, support particles are included that support the carbon particles, the carbon particles are supported by the support particles, so that they do not fall down on the substrate and lie one on top of the other, and many carbon particles are in an upright orientation with respect to the substrate. Moreover, by firing the ink after applying it, the organic binder and the solvent decompose, and carbon particles remain adhering to the conductor on the substrate. Moreover, the carbon material including 6-membered carbon rings is a good electrical conductor, and its work function is low, so that if in a vacuum environment an electric field is applied to the carbon particles of the electron-emitting element in accordance with the present invention, the carbon particles emit electrons along the force lines of the electric field. Since many carbon particles are in an upright orientation with respect to the substrate surface, an electric field tends to concentrate at the edges of the individual carbon particles, so that the emission of numerous electrons can be achieved with a weaker electric field, i.e. a lower driving voltage. Consequently, in accordance with the present invention, an electron-emitting element with high electron emission efficiency can be obtained with an inexpensive process suitable for mass production, such as printing, so that an electron-emitting element is obtained that can be suitably used for an image display device.

In the carbon ink and the electron-emitting element in accordance with the present invention, it is preferable that the size of the support particles on the substrate is smaller than a longitudinal length of the carbon particles. With this configuration, after the carbon ink has been applied to, for example, the substrate, the carbon particles enclose the support particles, but because their longitudinal length is longer than the size of the support particles, they do not form a film on the support particles, so that it can be ensured with better reliability that numerous carbon particles stand in an upright orientation on the substrate to which they have been applied. Consequently, in accordance with the present invention, it can be ensured with high reliability that an electron-emitting element is obtained, having electron-emitting portions with high efficiency, so that an electron-emitting element suitable for an image display device can be obtained.

In the carbon ink and the electron-emitting element in accordance with the present invention, it is preferable that the support particles are selected from the group consisting of a self-combustible powder that decomposes into a gas when heated or burned, and a thermally decomposing foaming agent powder. With this configuration, the ink is fired after it has been applied, and not only the organic binder and the solvent, but also the support particles are decomposed, so that only the carbon particles remain adhering to the conductor of the substrate in an upright orientation with respect to the substrate. The carbon material having a 6-membered carbon ring is a good electrical conductor, the potential of the conductor spreads through the entire aggregation of carbon particles, and the electric field reaches even the voids after the support particles have been decomposed, so that the electron emission efficiency can be improved even further.

In the carbon ink and the electron-emitting element in accordance with the present invention, it is preferable that decomposition temperature of the combustible powder and the decomposition temperature of the thermally decomposing foaming agent powder is lower than the decomposition temperature of the organic binder. With this configuration, the combustible powder or the thermally decomposing foaming agent powder are decomposed first, while the organic binder maintains numerous carbon particles in an upright orientation with respect to the substrate during the firing after the carbon ink is applied. Thus, the condition where numerous carbon particles stand in an upright orientation with respect to the substrate to which they are applied can be realized with better reliability. Consequently, in accordance with the present invention, it can be ensured with better reliability that an electron-emitting element is obtained, having electron-emitting portions with high efficiency, so that an electron-emitting element suitable for an image display device can be obtained.

In the carbon ink and the electron-emitting element in accordance with the present invention, it is preferable that, in an aggregation of carbon particles, voids having a size in the range of 0.05 to 5 $\mu$m have been formed by decomposing the support particles. With this configuration, the carbon particles form aggregations enclosing voids of sizes in this range, so that even more carbon particles stand in an upright orientation on the substrate, and the influence of the electric field extends into the inside of the aggregations, which improves the electron emission efficiency even further.

In the carbon ink and the electron-emitting element in accordance with the present invention, it is preferable that the carbon particles include carbon nanotubes. With this configuration, the carbon nanotubes do not only have a high electron emission efficiency due to their longish, rod-like molecule shape, but in conjunction with the present invention, many carbon nanotubes are supported by the support particles, and assume an upright orientation with respect to the substrate to which they adhere, so that electric fields tend to concentrate even better at the tip of the carbon nanotubes, which leads to an even higher efficiency. Consequently, in accordance with the present invention, it can be ensured with better reliability that an electron-emitting element is obtained, having electron-emitting portions with high efficiency, so that an electron-emitting element suitable for an image display device can be obtained.

In the carbon ink and the electron-emitting element in accordance with the present invention, it is preferable that the carbon particles include graphite. Graphite is an inexpensive material that is easy to obtain industrially, but its efficiency of electron emission in an electric field is not as high as that of carbon nanotubes. However, by combining it with the present invention, numerous graphite particles are supported by the support particles, and can be adhered in an upright orientation with respect to the substrate to which they have been applied, so that electric fields tend to concentrate at the tip of the graphite crystals, which leads to a higher electron emission efficiency. Consequently, in accordance with the present invention, it can be ensured with better reliability that an electron-emitting element is obtained, having electron-emitting portions with high efficiency, so that an electron-emitting element suitable for an image display device can be obtained.

Moreover, if carbon fibers made into graphite powder are used for the carbon particles of the present invention, the directionality of the carbon particle clusters is improved, which has the effect of enhancing the efficiency.

A method for manufacturing an electron-emitting element in accordance with the present invention comprises filling the above-described carbon ink at least into a patterned concave board; transferring the carbon ink filled into the patterned concave board to a blanket; and transferring the carbon ink transferred to the blanket to a substrate. With this configuration, the carbon ink can be transferred and applied reliably on the substrate or the cathode wiring, even when carbon particles, support particles and organic binder with different particle sizes are mixed in the carbon ink. Moreover, numerous carbon particles are applied in an upright orientation with respect to the substrate, i.e. in the same condition in which the carbon ink is filled in the concave board. As a result, in accordance with the manufacturing method of the present invention, an electron-emitting element having electron-emitting portions with high efficiency is obtained in an inexpensive process suitable for mass production, so that an electron-emitting element suitable for an image display device can be obtained.

Using the carbon ink and the electron-emitting element of the present invention, it is possible to make an image display device. In a first configuration, an image display device for forming images by causing a phosphor layer to emit light with electrons emitted from electron-emitting elements includes a vacuum container; a phosphor layer; a substrate provided with a cathode wiring made of a patterned conductor; and electron-emitting elements made by applying, to predetermined positions of the substrate, a carbon ink made into a paste with an organic binder and a solvent, the ink comprising (i) carbon particles having a 6-membered carbon ring, and (ii) support particles for supporting the carbon particles, and firing the ink. The cathode wiring is patterned into stripes. The phosphor layer has electrically separated stripes that are arranged in a plane parallel to the stripes of the cathode wiring and extend substantially perpendicular to the stripes of the cathode wiring. The image display device is matrix-driven between the stripes of the phosphor layer and the stripes of the cathode wiring. With this configuration of an image display device, forming electron-emitting elements at the matrix intersections formed by the stripes of the cathode wiring and the stripes of the phosphor layer, and temporally changing the potential of each of the stripes in accordance with an image to be displayed causes electrons to be emitted only from electron-emitting elements at the intersections where the electric field between the stripes exceeds a value at which the electron-emitting element emits electrons, whereby the phosphor layer temporally emits light only at predetermined portions, so that, as a result, an image can be displayed. The electron-emitting element of the present invention can be manufactured in a process that is inexpensive and suitable for mass production, and its efficiency is high, so that the image display device configured as described above similarly can be manufactured in a process that is inexpensive and suitable for mass production, and has high efficiency.

In a second configuration, an image display device for forming images by causing a phosphor layer to emit light with electrons emitted from electron-emitting elements includes a vacuum container; a phosphor layer; a substrate provided with a cathode wiring made of a patterned conductor; electron-emitting elements made by applying, to predetermined positions of the substrate, a carbon ink made into a paste with an organic binder and a solvent, the ink comprising (i) carbon particles having a 6-membered carbon ring, and (ii) support particles for supporting the carbon particles, and firing the ink; and gate electrodes arranged between the phosphor layer and the substrate. The cathode wiring is patterned into stripes. The gate electrodes have electrically separated stripes that are arranged in a plane parallel to the stripes of the cathode wiring and extend substantially perpendicular to the stripes of the cathode wiring. The image display device is matrix-driven between the stripes of the phosphor layer and the stripes of the cathode wiring. With this configuration of an image display device, forming electron-emitting elements at the matrix intersections formed by the stripes of the cathode wiring and the stripes of the gate electrodes, and temporally changing the potential of each of the stripes in accordance with an image to be displayed causes electrons to be emitted only from electron-emitting elements at the intersections where the electric field between the stripes exceeds a value at which the electron-emitting element emits electrons, whereby the phosphor layer temporally emits light only at predetermined portions, so that, as a result, an image can be displayed. The electron-emitting element of the present invention can be manufactured in a process that is inexpensive and suitable for mass production, and its efficiency is high, so that the image display device configured as described above similarly can be manufactured in a process that is inexpensive and suitable for mass production, and has high efficiency.

It is preferable that the image display device according to the present invention further comprises control electrodes between the phosphor layer and the gate electrodes, the control electrodes functioning to focus or to focus and deflect an electron beam. The electron-emitting element of the present invention has a very high electron emission efficiency, so that its application area can be small, and since it can be patterned in a printing step, when it is applied at the matrix intersections, it can be regarded as a dot in comparison to the size of the pixels of the phosphor layer. Applying to this configuration the principle that light from one point can be focussed by simple optical means on one point, the focussing operation of the control electrode plate focuses the electron beam emitted by one point on one point on the phosphor layer corresponding to the electron-optical image plane, within the scope of aberrations. Thus, the spot size on the phosphor layer can be reduced, thereby attaining an image display device with a higher image resolution.

Moreover, if this configuration is further provided with a deflection function, such a deflection function can scan a small focused spot over a plurality of phosphor pixels and let these phosphor pixels emit light, improving the resolution even further. Thus, with this configuration, an image display device can be obtained, that can be manufactured in an inexpensive process suitable for mass production, that has high efficiency and improved resolution.

In the image display device of the present invention, it is preferable that the substrate is integrated into the vacuum container. Combining the substrate and the vacuum container into one member, reduces material costs and facilitates the assembly process, which makes the image display device even less expensive.

DESCRIPTION OF THE PREFERRED EMBODIMENTS

The following is a description of the preferred embodiments, with reference to the accompanying drawings. In these embodiments, corresponding members have been given the same numbers, and are only explained where necessary, so as to avoid double explanations.

First Embodiment

Figure 1A:
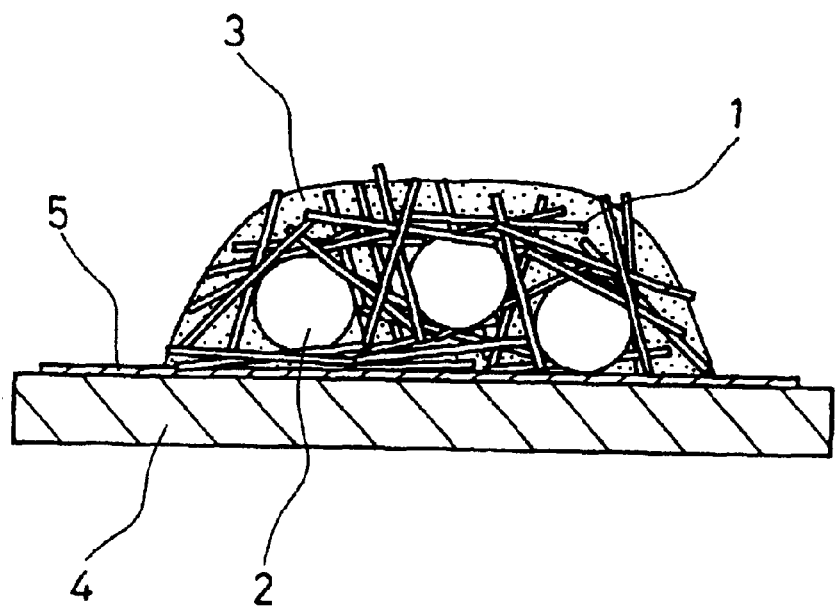
FIG. 1 is a cross-sectional drawing of an electron-emitting element according to a first embodiment of the present invention.
Figure 1B:
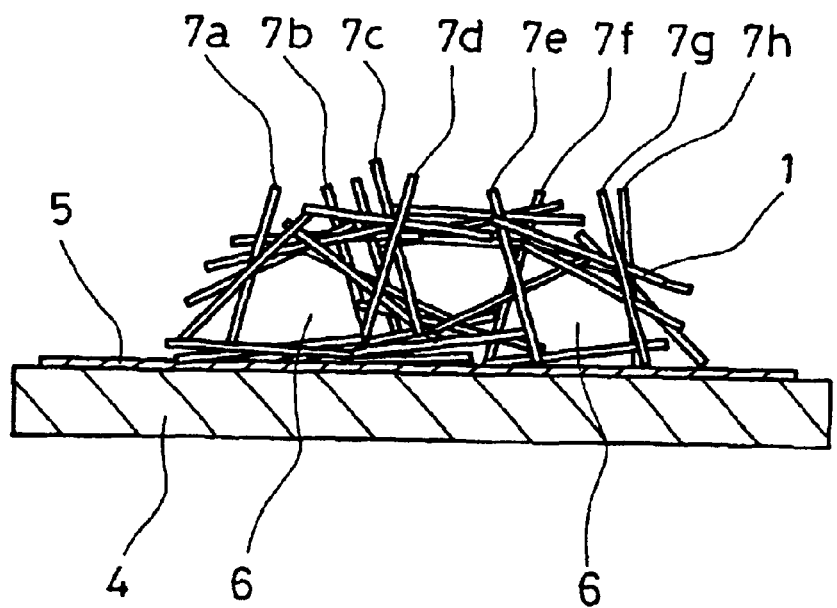

FIG. 1 is a schematic cross-sectional drawing, showing an electron-emitting element according to a first embodiment of the present invention. FIG. 1A schematically shows the electron-emitting element of the present invention with carbon ink applied to it, and FIG. 1B schematically shows the electron-emitting element after the ink has been fired. In the electron-emitting element in FIG. 1, numeral 1 denotes carbon particles, and numeral 2 denotes support particles, which are made of a material that decomposes into gas during a firing step. Numeral 3 denotes an organic binder, numeral 4 denotes a substrate, and numeral 5 denotes a cathode wiring.

The carbon ink of the present embodiment contains carbon particles including a 6-membered carbon ring, and is made into a paste with the organic binder 3 and a solvent. The carbon ink comprises the support particles 2, which support the carbon particles 1. When this carbon ink is applied beforehand to predetermined positions of the substrate 4 with the cathode wiring 5, the carbon particles 1 do not fall down onto the substrate 4, as can be seen in FIG. 1A, and numerous carbon particles 1 remain in an upright orientation with respect to the substrate 4. To apply the carbon ink, the ink's properties can be taken advantage of, and the ink can be applied in a certain pattern with a printing method, so that manufacturing is possible with few steps and suitable for mass production. In the drawing, the carbon particles are drawn as rod-shaped particles, to make the operation of the present invention clear. Moreover, if the substrate 4 is conductive, the cathode wiring 5 does not necessarily have to be provided, as long as the electron-emitting carbon particles 1 can be supplied with current.

Next, the entire element including the carbon ink as shown in FIG. 1A is fired. After the firing, the organic binder 3 and the support particles 2 are decomposed, for example, by burning, and only the carbon particles 1 remain attached to the substrate 4 or the cathode wiring 5 in an upright orientation with respect to the substrate 4, as shown in FIG. 1B. Voids 6 are formed where the support particles were.

As a material for the support particles 2, which are decomposed in the firing step, a pulverized material with a predetermined average particle size having self-combustibility, such as cellulose nitrate, or a powder of a thermally decomposing foaming agent having azodicarboamide or dinitroso pentamethylene tetramine as a main component, i.e. a material decomposing into gas when heated, can be used.

If isobutylmethacrylate, poly-α-methylstyrene, polymethylmeth-acrylate, polytetrafluoroethylene, or another depolymerizing resin is used as a material for the organic binder 3, it can be burned away sufficiently by heating and firing, and since the inherent strength of the carbon particles 1 is high, they do not come off after the firing, and a favorable condition is attained.

Furthermore, if butylcarbitol or isobutylcarbitol is used in a suitable amount as a solvent when using the organic binder 3, the ink viscosity can be adjusted, and a suitable carbon ink for the printing step can be attained.

The electron-emitting element, formed and configured as described above, functions as follows. When an electric field is applied from the top in FIG. 1B, the electric field concentrates at the tips of the carbon particles 1, which stand upright with respect to the substrate 4, such as the carbon particles 7a to 7h in the drawing. The carbon material including a 6-membered carbon ring is characterized in that it is a good electrical conductor, and has a low work function, so that it starts to emit electrons at low electric field strengths, and if the electric field is concentrated at their tip as in the present invention, a large current is emitted in proportion to the concentration of the field. For a regular electric field electron emission, a concentration of the electric field leads to a considerable rise of the electron emission efficiency, as is shown by $$I = aE^2 e^{-\frac{b}{E}}$$

wherein I is the emission current, E is the electric field, and a and b are constants.

Since the drawings are, for simplification, schematic cross-sectional drawings, only a moderate number of the tips 7a to 7h of the carbon particles submitted to the concentration of the electric field are shown in the drawings, but in fact, there are very numerous carbon particles 1 arranged upright with respect to the substrate 4, so that there is no exhaustion and variation of the electron emission.

As has been explained above, with the carbon ink and the electron-emitting element of the present invention, carbon particles 1 including a 6-membered carbon ring as the electron-emitting material are made into an ink, which can be applied with an inexpensive method suitable for mass production, such as printing onto a substrate 4 or a cathode wiring 5 while specifying position and extent. Moreover, by firing the ink applied to the substrate 4 or cathode wiring 5, numerous carbon particles 1 remain in an upright orientation with respect the substrate 4, without falling down on the substrate 4, so that due to the effect of the concentrated electric field, even with a weak electric field, i.e. a low driving voltage, numerous electron emissions can be attained. Consequently, with this invention, an electron-emitting element with high electron emission efficiency can be attained with a printing step, which is inexpensive and is suitable for mass production, so that an electron-emitting element suitable for an image display device can be obtained.

Good results can be attained if carbon nanotubes are used for the carbon particles 1 in the carbon ink and the electron-emitting element of the present embodiment. Carbon nanotubes have been discovered recently, together with other new carbon crystalline materials, such as fullerenes. Carbon nanotubes are cylindrical and include 6-membered carbon rings. The diameter of the carbon nanotubes is several nm to several dozen nm, and their length can exceed several $\mu$m. If the carbon nanotubes are pulverized and used for the carbon particles 1 of the carbon ink of the present invention, not only is their electron emission efficiency high because of their rod-like longish molecule shape, but since they adhere to the substrate 4 to which they are applied more effectively in an upright orientation, the electric field can be concentrated better at the tip of the carbon nanotubes, which display the best known electron emission properties, so that an even higher efficiency can be expected.

It is also possible to use graphite powder for the carbon particles 1. Graphite has 6-ring-membered crystals aligned on a sheet, and has scale-shaped particles. Graphite is an inexpensive material that is easy to obtain industrially, but since electron emission efficiency is determined by the molecule shape, its efficiency is not as high as that of carbon nanotubes. However, by combining it with the present invention, numerous graphite particles can be adhered in an upright orientation with respect to the substrate 4 to which they have been applied. The inventors have observed that for carbon materials with 6-membered carbon rings, such as graphite, the portions where the 6-membered carbon rings are broken, i.e. at the edge of the scale-shaped particles, the electron emission can be attained most easily. Consequently, if graphite is used for the carbon particles 1 of the present invention, the electric field can be concentrated at the edges of the graphite crystals, and the graphite can be used as a material having high electron emission efficiency.

Moreover, if carbon fibers made into pulverized graphite are used for the carbon material, the directionality of the carbon particle clusters is improved as is the case for carbon nanotubes, which has the effect of enhancing the efficiency.

Moreover, the decomposition temperature for the support particles 2, which are decomposed by heating or burning, in the carbon ink and the electron-emitting element of this embodiment is set to be lower than the decomposition temperature of the organic binder 3. If the organic binder 3 and the support particles 2 are eventually decomposed by firing, an electron-emitting element having the effect of the present invention can be obtained. In this example, the support particles 2 are decomposed first, while the organic binder 3 maintains numerous carbon particles 1 in an upright orientation with respect to the substrate 4 during the firing after the carbon ink is applied. Thus, the condition where numerous carbon particles 1 stand in an upright orientation with respect to the substrate 4, as shown in FIG. 1, can be realized reliably.

Furthermore, the height of the support particles 2 (referred to as "size of the support particles 2" in the following) in the carbon ink or the electron-emitting element of the present embodiment is selected to be smaller than the length of the carbon particles 1 in the longitudinal direction. Here, "longitudinal direction" means the length of the rods in the case of rod-shaped particles, such as carbon nanotubes or carbon fibers, or the length of the longest side in the case of scale-shaped particles, such as graphite powder. When the carbon ink has been applied to the substrate 4, the carbon particles 1 enclose the support particles 2. If, in this situation, the size of the support particles 2 is much larger than the longitudinal length of the carbon particles 1, the carbon particles 1 become like a film on the support particles 2, lessening the effect of the electric field concentration. However, if the longitudinal length of the carbon particles 1 is selected to be longer than the support particles 2, the carbon particles 1 will not form a film on the support particles 2, and more carbon particles will assume an upright orientation with respect to the substrate 4 to which they have been applied. If the size of the support particles 2 is too small, the effect of the present invention is decreased, so that it is preferable that the size of the support particles 2 is at least half the longitudinal length of the carbon particles 1.

Moreover, as for the specific size of the carbon particles 1, if the carbon particles 1 are too short, the overall irregularities even out, so that the effect of the electric field concentration is decreased, and if the carbon particles 1 are too long, precise patterning with a printing step becomes difficult, so that preferably, the carbon ink has carbon particles with a length of 0.1 to 10 $\mu$m.

The size of the support particles 2 should be chosen to be in the range of 0.05 $\mu$m to 5 $\mu$m, depending on the size of the carbon particles 1. A spherical shape, without directionality, is effective to let as many carbon particles 1 as possible stand up against the substrate 4. However, the support particles of the present invention are not limited to spherical shapes, and other shapes of a certain thickness, such as rectangular solid, cube-shaped, pyramidal, conical, truncated pyramidal etc., are also possible, as long as they can let the carbon particles 1 stand upright with respect to the substrate 4, regardless of their orientation.

With this configuration, an electron-emitting element can be obtained, which is formed by applying carbon particles 1 having a 6-membered carbon ring on a substrate 4 or on a cathode wiring 5 provided on a substrate 4, and which has voids of a size in the range of 0.05 $\mu$m to 5 $\mu$m inside the aggregation of the carbon particles 1.

Moreover, this embodiment has been explained for the case that one group of carbon particles 1 functions as one independent electron-emitting element. However, needless to say, if the number of electrons emitted by one group of carbon particles 1 is insufficient to be used for an electron beam, it is also possible to combine a plurality of groups of carbon particles 1 to form one electron emission source.

Moreover, the drawings show the case where the carbon particles 1 all have the same size and the support particles 2 all have the same size, but the same effect as explained above can be obtained if particles 1 and 2 of different sizes are mixed, within the preferable range of sizes, because numerous particles 1 and 2 are present in the same application portion.

Second Embodiment

Figure 2:
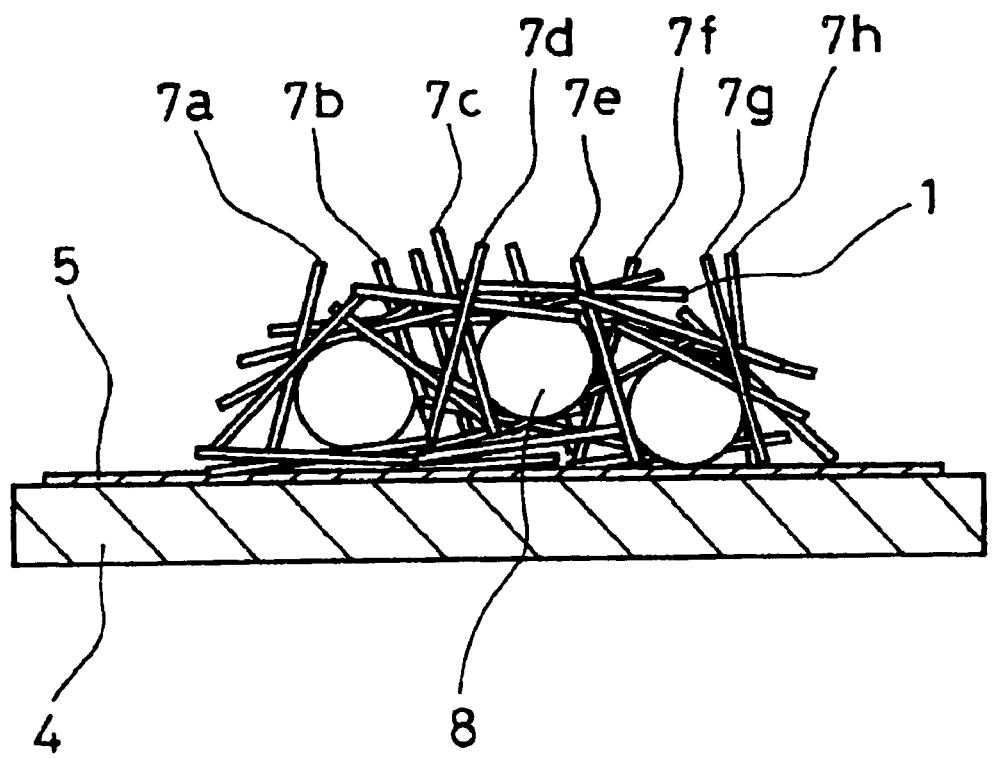
FIG. 2 is a cross-sectional drawing of an electron-emitting element according to a first embodiment of the present invention.

FIG. 2 is a schematic cross-sectional drawing of an electron-emitting element in accordance with a second embodiment of the present invention. FIG. 2 shows the element, after a carbon ink of the present invention has been applied to it and fired away. The aspect that is different form the first embodiment of the present invention is that the support particles are made of a material that does not decompose or burn away during the manufacturing steps. The following explanations use the same numbers for the same elements as in the first embodiment, in order to avoid duplicate explanations, and focus on the differences to the first embodiment of the present invention.

In the electron-emitting element shown in FIG. 2, numeral 1 denotes carbon particles, numeral 8 denotes support particles not decomposed by the firing step, numeral 4 denotes a substrate, and numeral 5 denotes a cathode wiring. Numerous carbon particles 1 are attached to the substrate 4 in an upright orientation with respect to the substrate 4. However, in contrast to the first embodiment, the support particles 8 remain after the firing.

For the support particles 8, a material should be used that does not decompose in the firing step, for example particles of an inorganic material such as glass, alumina or silica, or metal particles of aluminum, titanium, gold or nickel.

The following is an explanation of the operation of an electron-emitting element, formed and configured as described above. When an electric field is applied from the top in FIG. 2, the electric field concentrates at the tips of the carbon particles, which stand upright with respect to the substrate 4, such as the carbon particles 7a to 7h in the drawing, so that a high electron emission efficiency can be attained. As the support particles 8 remain even after the firing, the influence of the electric field is a little weaker than in the first embodiment, but the support particles 8 also stabilize the upright orientation of the carbon particles 1 with respect to the substrate 4 in all production steps, and enhance the reliability as the support particles 8 add to the adherence strength even after the burning.

Now, all structural elements and operational effects that have not been explained for this embodiment are the same as explained for the first embodiment, so that their further explanation has been omitted.

Third Embodiment

FIG. 3 is a diagram illustrating the principle of a part of a method for manufacturing an electron-emitting element in accordance with the present invention. An electron-emitting element made with the manufacturing method of this embodiment has basically the same configuration as the electron-emitting element of the first and second embodiments noted above (see FIGS. 1 and 2). The following is an explanation of a method for applying carbon ink by offset printing, which is a printing process characteristic for the present invention, and is part of the manufacturing process.

Figure 3A:
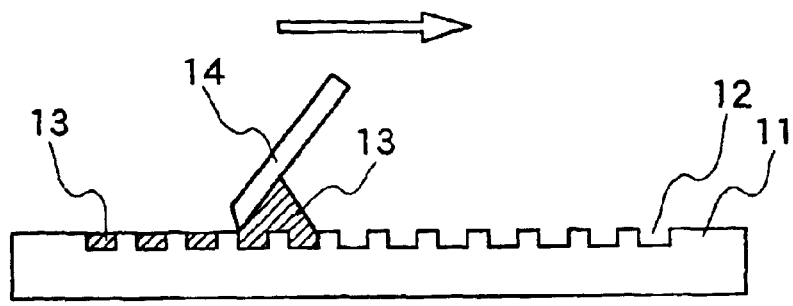
FIG. 3 is a diagram illustrating a method for manufacturing an electron-emitting element in accordance with the present invention.

As shown in FIG. 3A, a concave board 11 having concave portions 12 in a suitable predetermined pattern is prepared, and the concave board 11 is filled with carbon ink 13. The concave portions 12 of the concave board 11 can be filled easily by dripping a suitable amount of carbon ink 13 into them, or applying the carbon ink 13 with, for example, a squeegee 14.

Figure 3B:
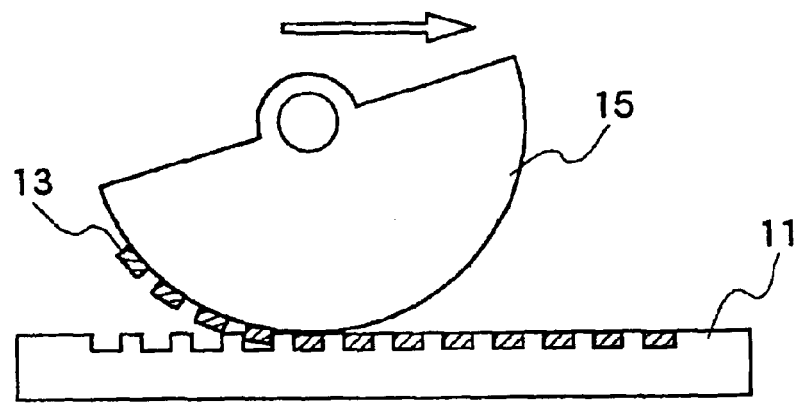

Then, the carbon ink 13 filled into the concave portions 12 is transferred to a blanket 15, as is shown in FIG. 3B. If silicone rubber is used for the transfer surface of this blanket 15, suitable transfers can be performed, as silicone rubber has good chemical resistance and is a soft material. Moreover, if the concave board 11 is flat, and the ink transfer face of the blanket 15 is arc-shaped, the carbon ink 13 can be transferred simply by pressing and rolling the blanket 15 over the concave board 11.

Figure 3C:
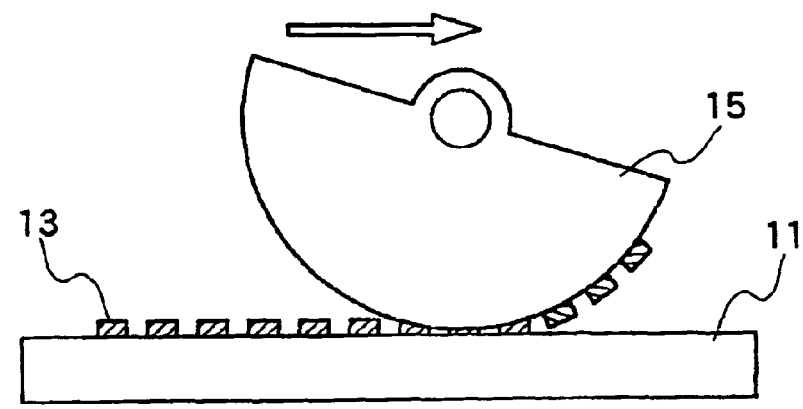

Then, the carbon ink 13, which has been transferred to the blanket 15, is transferred to a substrate 4 (see FIGS. 1 and 2), on which the electron-emitting element is to be formed, as shown in FIG. 3C. At this time, the carbon ink 13 can be applied on the substrate 4 with very high precision, for example if all positional references are aligned, i.e. if the positional reference of two orthogonal sides of the board, the pattern of the concave portions 12 in the concave board 11, the blanket 15 and the substrate 4 are aligned.

Using the above-noted printing step, the carbon ink 13 can be transferred and applied reliably on the substrate 4, even when carbon particles 1, support particles 2 (8) and organic binder 3 with different particle sizes are mixed in the carbon ink 13.

Figure 4:
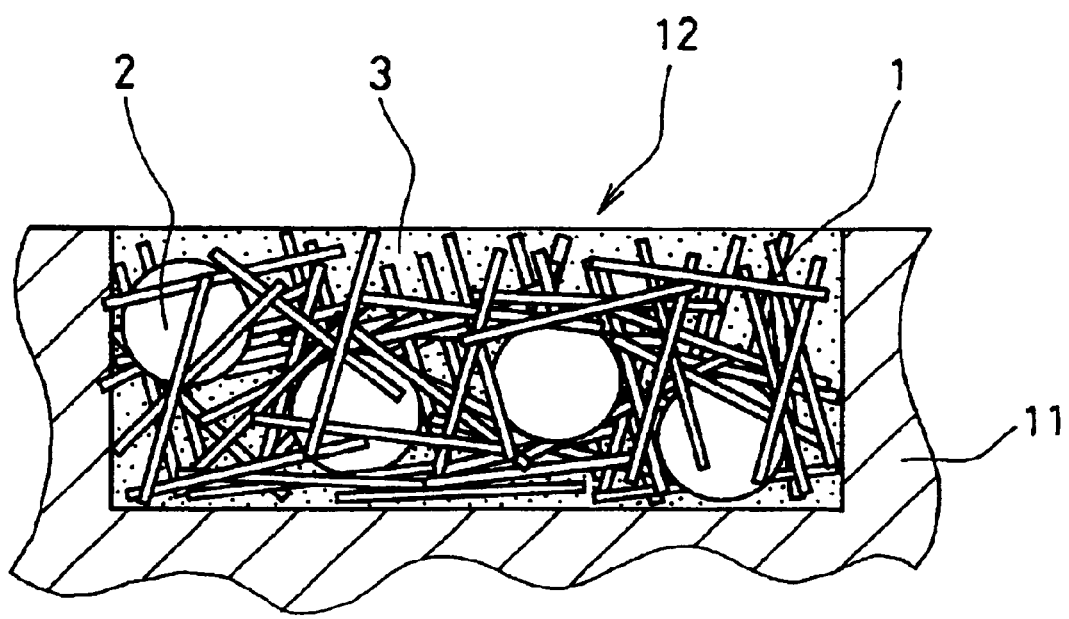
FIG. 4 is a cross-sectional drawing of carbon ink filled into a concave portion.

One of the surprising effects of the present invention is that by filling sufficiently mixed carbon ink 13 into concave portions 12 of a concave board 11 having a predetermined depth, numerous carbon particles 1 stand upright with respect to the substrate 4 to which the ink is applied, in the same orientation into which they had been filled into the concave portions 12. This orientation is shown in FIG. 4. Without disturbing the condition in which the structural elements, such as the carbon particles 1, the support particles 2 (8), and the organic binder 3 of the carbon ink 13 are intermingled during the filling, numerous carbon particles 1 are mixed in an upright position in the concave portion 12, as shown in FIG. 4. Consequently, in conjunction with the configuration of the carbon ink 13 of the present invention, the effect of this method is better than when another printing method is used. Moreover, to apply the carbon ink 13 with the above-noted printing step is inexpensive and suitable for mass production. Consequently, with the manufacturing method of the present invention, an electron-emitting element is attained having electron-emitting portions with high efficiency that are formed in an inexpensive step suitable for mass production, so that a favorable electron-emitting element used for an image display device can be attained.

It is preferable that there is no blurring during the transfer, and that the particles in the carbon ink 13 are arranged in several layers, so that suitable printing results and an electron-emitting element with high efficiency can be attained if the depth of the concave portion 12 is selected to be in the range of 5 $\mu$m and 40 $\mu$m, depending on the size of the carbon particles 1.

Fourth Embodiment

The following is an explanation of an image display device using an electron-emitting element according to a fourth embodiment of the present invention, with reference to the accompanying drawings. The electron-emitting element used for the image display device of this embodiment has basically the same configuration as the electron-emitting element of the first or the second embodiment noted above (see FIGS. 1B and 2), so that structural details of the electron-emitting element are omitted, and it is simply referred to as "electron-emitting element".

Figure 5:
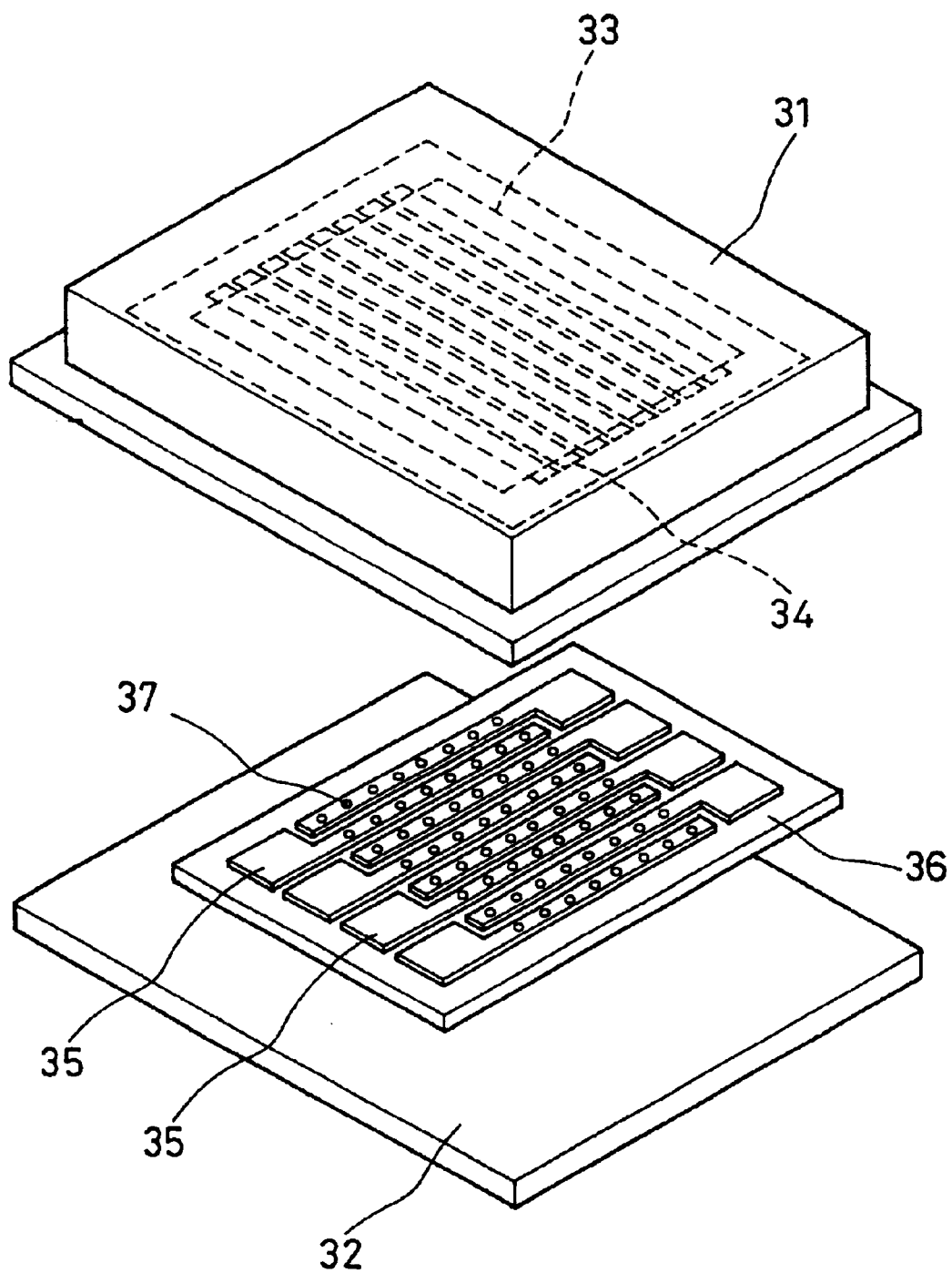
FIG. 5 is an exploded view of an image display device in accordance with a fourth embodiment of the present invention.

FIG. 5 is an exploded perspective view showing the configuration of an image display device using an electron-emitting element according to the present invention. The image display device shown in FIG. 5 includes a front panel 31, a rear panel 32, a phosphor layer 33 formed on the inside surface of the front panel 31, an anode wiring 34 of electrically separated stripes contacting the phosphor layer 33, a substrate 36, a cathode wiring 35 of a suitably patterned conductor formed on the substrate 36, and a plurality of electron-emitting elements 37.

A vacuum container is formed by the front panel 31 and the rear panel 32, and the other structural elements are enclosed inside this vacuum container. A vacuum of about $10^{-6}$ to $10^{-8}$ torr (ca. $10^{-4}$ to $10^{-6}$ Pa) is maintained in the vacuum container. The front panel 31 is made of a transparent member, so that light emitted from the phosphor layer 33 can be observed from the outside. However, the entire vacuum container does not have to be transparent, and the rear panel 32 can be made of any material that is suitable for maintaining a vacuum.

The phosphor layer 33 is made, for example, by applying a phosphor material that emits light when irradiated with an electron beam onto the inside surface of the front panel 31. If the image display device is a monochrome display, it is sufficient to apply a single phosphor material of a certain emission color on the inside surface of the front panel 31, but in case of a phosphor layer 33 for a color display, black stripes are applied to the inside surface of the front panel 31, and then a multitude of phosphor stripes is applied to the inside surface of the front panel 31, for example, in the order red (R), green (G) and blue (B). Such phosphor stripes can be formed on the front panel 31 with a direct printing process, such as offset printing, a transfer process, such as printing on a resin sheet and transferring the printed pattern by heat or pressure, or with a lithography process, as for a conventional cathode ray tube.

The anode wiring 34 contacts the phosphor layer 33 and is electrically separated into stripes. It is sufficient if the pitch of the stripes is the predetermined display dot pitch of the image display device, and it should be matched to the R, G, and B phosphor stripes in the case of a color display. If a transparent conductive material such as ITO (indium tin oxide) is used as a material for the anode wiring 34, it does not block the light emitted from the phosphor layer 33.

The cathode wiring 35 is disposed on the substrate 36, and is patterned into stripes that are arranged in a plane parallel to the stripes of the anode wiring 34 and extend substantially perpendicular to the stripes of the anode wiring 34. The aforementioned ITO can be used for the material for the cathode wiring 35, but the cathode wiring 35 does not necessarily have to be made of a transparent material, and it can also be patterned, for example, by printing a conductive paste, such as silver paste or gold paste, or photo-etching a wiring pattern after forming a conductive film, for example made of metal, on the substrate 36.

A plurality of electron-emitting elements 37 are arranged on the cathode wiring 35 at each intersection between the stripe-shaped anode wiring 34 and the cathode wiring 35. The specific structure of the electron-emitting elements 37 is the same as in the electron-emitting element of the first and the second embodiment noted above (see FIGS. 1B and 2), so that a further explanation of their configuration and manufacturing method has been omitted.

The stripe-shaped cathode wiring 35 and the anode wiring 34 contacting the phosphor layer 33 drive the matrix rows and columns in the image display device configured as described above and since the electron-emitting elements 37 are arranged at the intersections of the matrix, the electron-emitting elements 37 at predetermined intersections can be caused to emit electrons, in accordance with the potential difference between the stripe-shaped rows and columns. For example, if a certain selected stripe in the anode wiring 34 is set to high voltage and all other stripes are set to a voltage lower than that high voltage, and if a certain selected stripe in the cathode wiring 35 is set to low voltage and all other stripes are set to a voltage higher than that low voltage, then a strong electric field is generated only at the intersection of the selected stripes. Starting with this strong electric field, electrons are emitted only at certain predetermined intersections, and only at positions of the phosphor layer 33 corresponding to these intersections are electrons accelerated to collide with the phosphor so that the phosphor emits light. If the applied voltage changes temporally in accordance with the image display, it is possible to cause only predetermined portions of the phosphor layer to emit light temporally, whereby an image can be displayed.

Since the electron emission efficiency of the electron-emitting element 37 of the present invention is high, the matrix driving voltage applied between the anode wiring 34 and the cathode wiring 35 can be kept low, and an image display device of high efficiency can be realized with a small driving circuit, and, as another surprising effect of the present invention, an inexpensive image display device with high efficiency can be obtained.

The present embodiment has been explained for the case that the substrate 36 and the rear panel 32 are separate members. However, it is also possible to form the cathode wiring 35 and the electron-emitting elements 37 directly on the rear panel 32. In this case, the substrate 36 is integrated into the rear panel 32, which is part of the vacuum container, so that by combining them into one member, material costs can be reduced and the assembly process is facilitated, which makes the image display device even less expensive.

Fifth Embodiment

The following is an explanation of an image display device using an electron-emitting element according to a fifth embodiment of the present invention. The electron-emitting element used for the image display device of this embodiment has basically the same configuration as the electron-emitting element of the first or the second embodiment noted above (see FIGS. 1B and 2), so that structural details of the electron-emitting element are omitted, and it is simply referred to as "electron-emitting element". Moreover, detailed explanations of structural elements that are the same as in the image display device of the fourth embodiment have been omitted.

Figure 6:
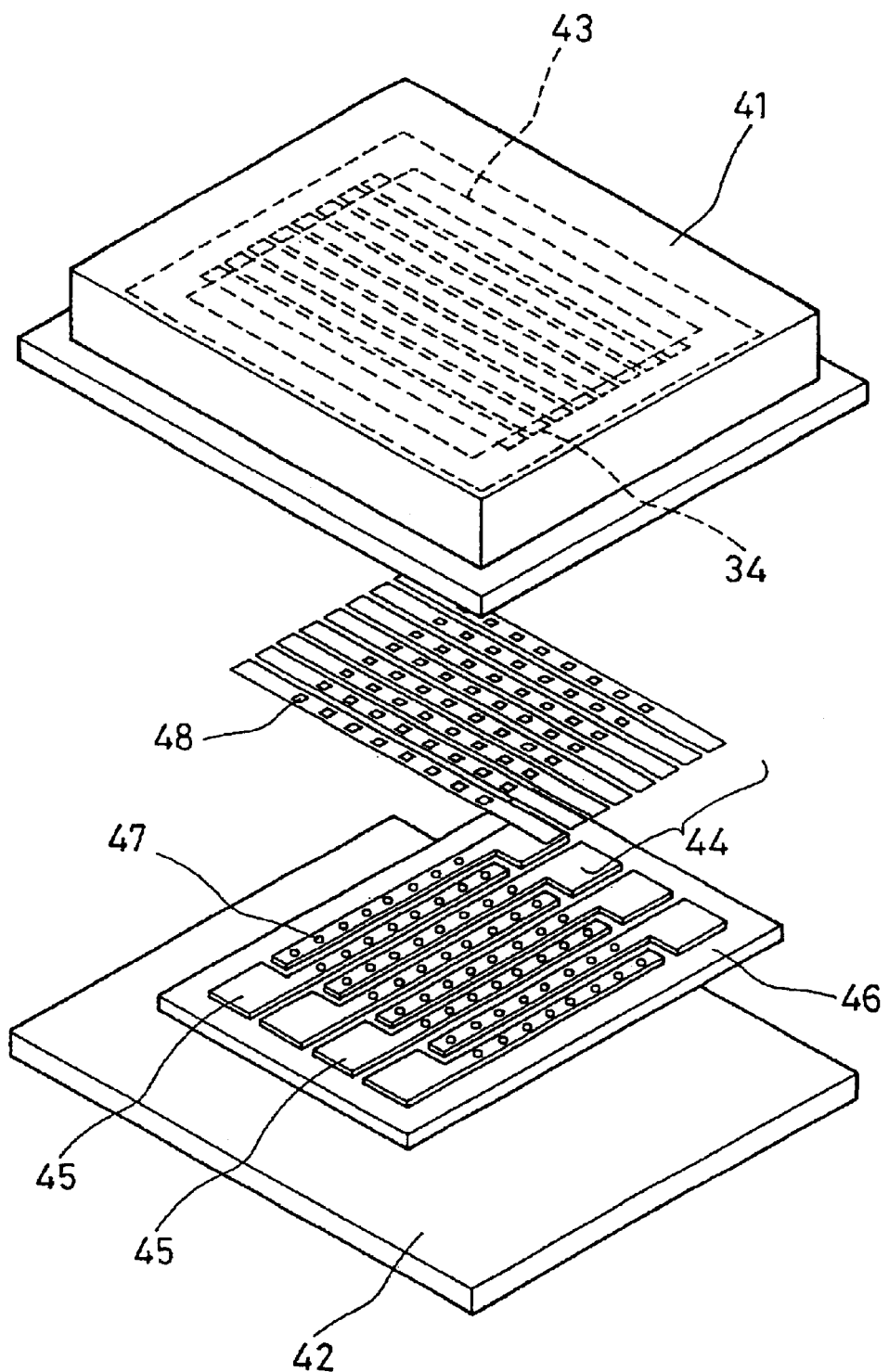
FIG. 6 is an exploded view of an image display device in accordance with a fifth embodiment of the present invention.

FIG. 6 is an exploded perspective view showing the configuration of an image display device using an electron-emitting element according to the present invention. The image display device shown in FIG. 6 includes a front panel 41, a rear panel 42, a phosphor layer 43 formed on the inside surface of the front panel 41, a substrate 46, a cathode wiring 45 of a suitably patterned conductor formed on the substrate 46, gate electrodes 44 for controlling the emission of electrons arranged between the phosphor layer 43 and the substrate 46, and a plurality of electron-emitting elements 47.

A vacuum container is formed by the front panel 41 and the rear panel 42, and the other structural elements are enclosed inside this vacuum container. Moreover, a vacuum of about $10^{-6}$ to $10^{-8}$ torr (ca. $10^{-4}$ to $10^{-6}$ Pa) is maintained in the vacuum container formed by the front panel 41 and the rear panel 42.

The cathode-wiring 45 is patterned into stripes, and the gate electrodes 44 have electrically separated stripes that are arranged in a plane parallel to the stripes of the cathode wiring 45 and extend substantially perpendicular to the stripes of the cathode wiring 45. Through holes 48 for electron beams emitted from the electron-emitting elements 47 are formed in the gate electrodes 44. Then, the electron-emitting elements 47 are arranged on the cathode wiring 45 at the intersections between the stripe-shaped cathode wiring 45 and the gate electrodes 44.

The material for the front panel 41 and the rear panel 42, as well as the specific configuration of the phosphor layer 43, the cathode wiring 45, and the electron-emitting elements 47 can be the same as for the image display device of the above-noted fourth embodiment (see FIG. 5), so that further explanations regarding their structure and manufacturing methods have been omitted.

The stripe-shaped cathode wiring 45 and the gate electrodes 44 drive the matrix rows and columns in the image display device configured as described above, and since the electron-emitting elements 47 are arranged at the intersections of the matrix, the electron-emitting elements 47 at predetermined intersections can be caused to emit electrons, in accordance with the potential difference between the stripe-shaped rows and columns. For example, if a certain selected stripe of the gate electrodes 44 is set to high voltage and all other stripes are set to a voltage lower than that high voltage, and if a certain selected stripe in the cathode wiring 45 is set to low voltage and all other stripes are set to a voltage higher than that low voltage, then a strong electric field is generated only at the intersection of the selected stripes. Starting with this strong electric field, electrons are emitted only at certain predetermined intersections, pass the electron beam through holes 48 provided in the gate electrodes 44, and only at positions of the phosphor layer 43 corresponding to these intersections are electrons accelerated to collide with the phosphor so that the phosphor emits light. If the applied voltage changes temporally in accordance with the image display, it is possible to cause only predetermined portions of the phosphor layer to emit light temporally, whereby an image can be displayed.

Since the electron emission efficiency of the electron-emitting elements 47 of the present invention is high, the matrix driving voltage applied between the gate electrodes 44 and the cathode wiring 45 can be kept low, and an image display device of high efficiency can be realized with a small driving circuit, and, as another surprising effect of the present invention, an inexpensive image display device with high efficiency can be obtained.

Figure 7:
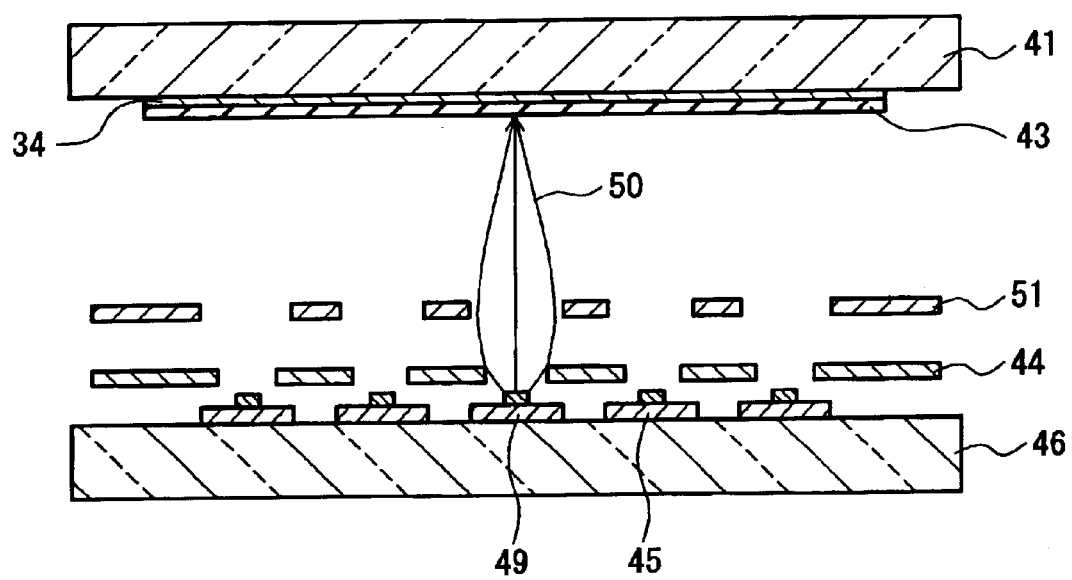
FIG. 7 is a cross-sectional drawing showing how an image display device in accordance with the present invention operates.
Figure 8A:
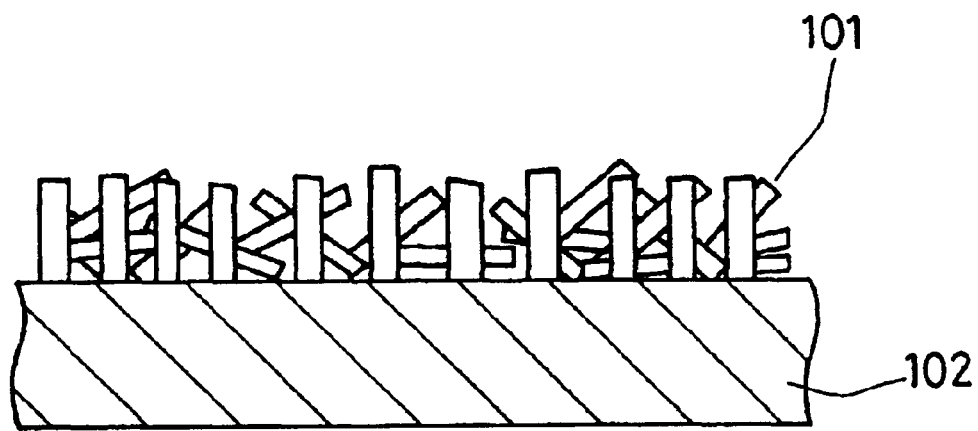
FIG. 8 is a schematic cross-sectional drawing of a first conventional electron-emitting element.
Figure 8B:
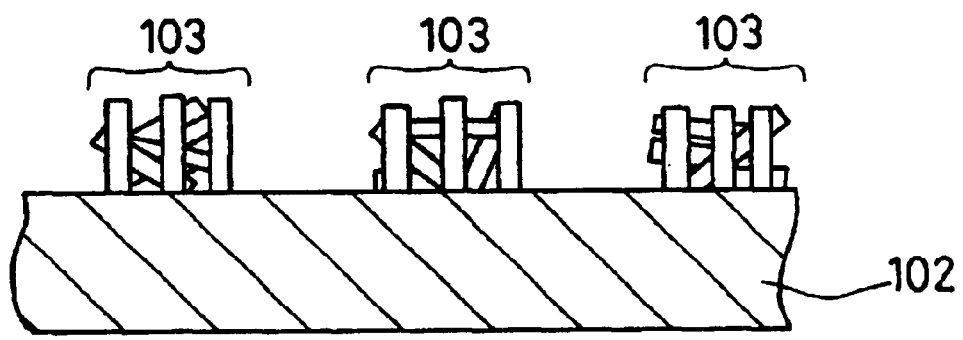
Figure 9:
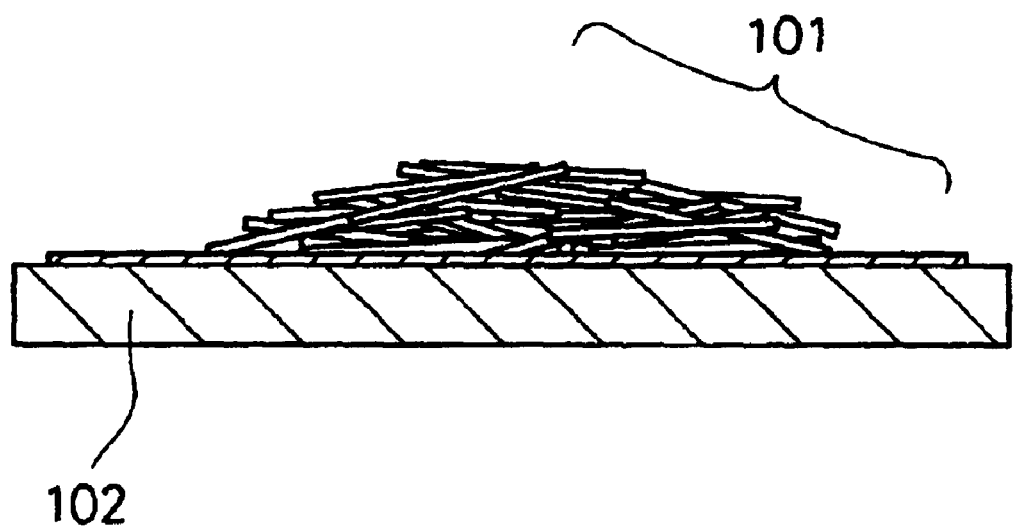
FIG. 9 is a more detailed cross-sectional drawing showing the structure of a first conventional electron-emitting element.
Figure 10:
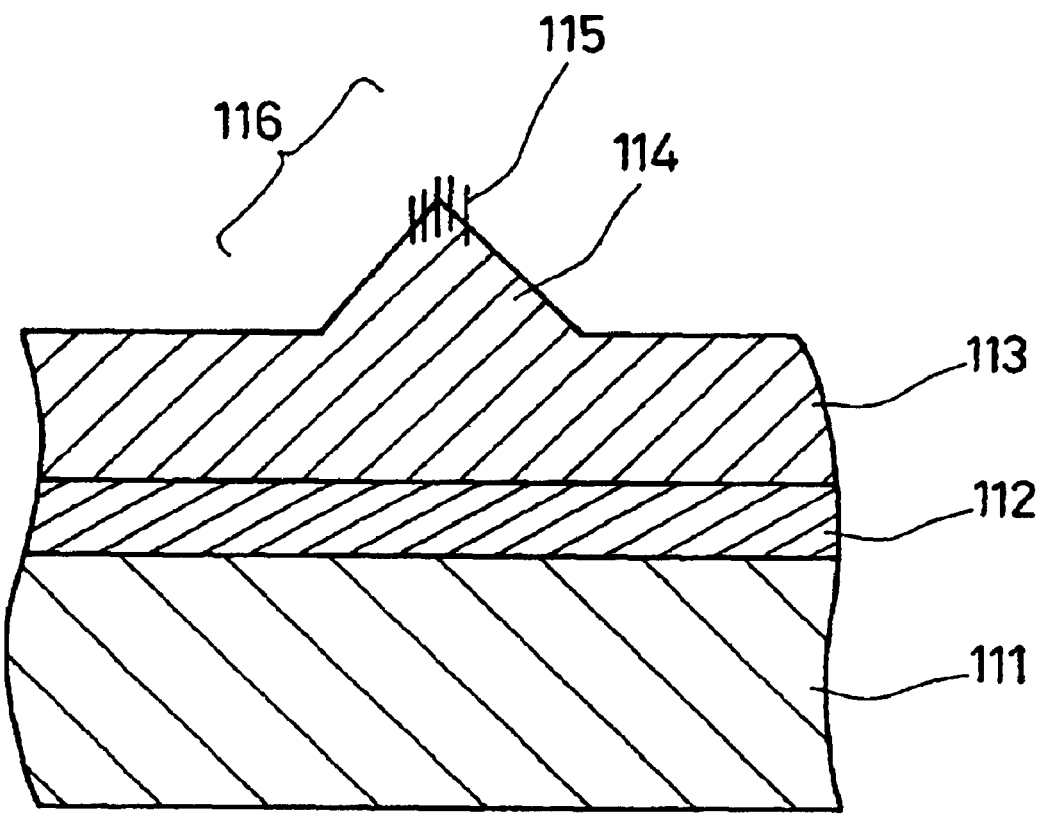
FIG. 10 is a schematic cross-sectional drawing of a second conventional electron-emitting element.
Figure 11:
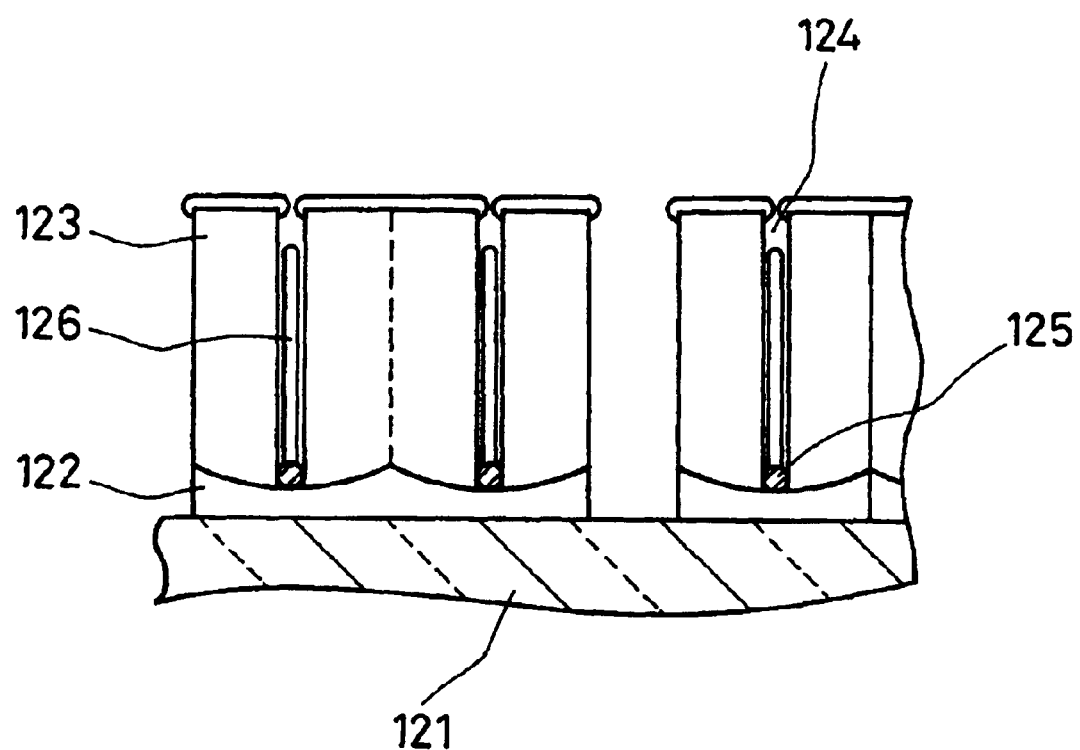
FIG. 11 is a schematic cross-sectional drawing of a third conventional electron-emitting element.

FIG. 7 is a cross-sectional drawing of an example of an image display device of this embodiment, further provided with an electrode plate 51 for focusing electron beams. Numeral 49 denotes a quasi-dot-shaped electron-emitting element, and numeral 50 denotes the trajectory of an electron emitted by the quasi-dot-shaped electron-emitting element 49. The other structural elements are substantially the same as in the above-noted configurations, so that the same structural elements have been provided with the same numbers, and their further explanation has been omitted, focussing on the aspects that are different and the operation of the electrode plate 51.

The electron-emitting element 49 of the present invention has a very high electron emission efficiency, so that its application area can be small, and since it can be patterned in a printing step, when it is applied at the intersections between the gate electrodes 44 and the cathode wiring 45, it can measure only a fraction of the surface area of a pixel of the phosphor layer, so that it can be regarded practically as a dot (i.e. quasi-dot-shaped).

The electrons emitted from the quasi-dot-shaped electron-emitting elements 49 initially assume divergent electron trajectories 50, as shown in FIG. 7. However, similar to the principle that light from one point can be focussed by simple optical means on one point, the focussing operation of the electrode plate 51 focuses the electron beam emitted by the quasi-dot-shaped electron-emitting elements 49 on substantially one point on the phosphor layer 43 corresponding to the electron-optical image plane, within the scope of aberrations. Thus, the spot size on the phosphor layer 43 can be reduced, thereby attaining a higher image resolution.

Moreover, if this configuration is further provided with a deflection function, such a deflection function can scan a small focused spot over a plurality of phosphor pixels and let these phosphor pixels emit light, so that the number of display pixels can be increased to be larger than the number of electron-emitting elements 49, enabling a high resolution of the displayed image, even when the density of the electron-emitting element 49 cannot be increased over a certain level, because of structural limitations for the above-noted matrix structure. Consequently, this configuration has the surprising effect that an inexpensive image display device having high efficiency can be obtained, which has even higher resolution.

The present embodiment has been explained for the case that the substrate 46 and the rear panel 42 are separate members. However, it is also possible to form the cathode wiring 45 and the electron-emitting elements 47 directly on the rear panel 42. In this case, the substrate 46 is integrated with the rear panel 42, which is part of the vacuum container, so that by combining them into one member, material costs can be reduced and the assembly process is facilitated, which makes the image display device even less expensive.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An image display device for forming images by causing a phosphor layer to emit light with electrons emitted from electron-emitting elements, the image display device comprising:
    a vacuum container;
    a phosphor layer;
    an anode wiring contacting the phosphor layer;
    a substrate provided with a cathode wiring made of a patterned conductor; and
    electron-emitting elements made by
        applying, to predetermined positions of the substrate, a carbon ink made into a paste with an organic binder and a solvent, the ink comprising (i) carbon particle having a 6-membered carbon ring, and (ii) support particles for supporting the carbon particles, and
        firing the ink, wherein, after the firing, the support particles are decomposed, forming voids in an aggregation of the carbon particles;
    wherein the cathode wiring is patterned into stripes;
    the phosphor layer has electrically separated stripes that are arranged in a lane substantially parallel to the stripes of the cathode wiring and extend substantially perpendicular to the stripes of the cathode wiring; and the image display device is matrix-drive between the stripes of the phosphor layer and the stripes of the cathode wiring.

2. The image display device of claim 1, wherein the substrate is integrated into the vacuum container.

3. An image display device for forming images by causing a phosphor layer to emit light with electrons emitted from electron-emitting elements, the image display device comprising:
    a vacuum container;
    a phosphor layer;
    an anode wiring contacting the phosphor layer;
    a substrate provided with a cathode wiring made of a patterned conductor;
    electron-emitting elements made by
        applying, to predetermined positions of the substrate, a carbon ink made into a paste with an organic binder and a solvent, the ink comprising (i) carbon particles having a 6-membered carbon ring, and (ii) support particles for supporting the carbon particles, and
        firing the ink; wherein, after the firing, the support particles are decomposed, forming voids in an aggregation of the carbon particles; and
    gate electrodes arranged between the phosphor layer and the substrate;
    wherein the cathode wiring is patterned into stripes;
    the gate electrodes have electrically separated stripes that are arranged in a plane substantially parallel to the stripes of the cathode wiring and extend substantially perpendicular to the stripes of the cathode wiring; and the image display device is matrix-drive between the stripes of the phosphor layer and the stripes of the cathode wiring.

4. The image display device of claim 3, further comprising control electrodes between the phosphor layer and the gate electrodes, the control electrodes functioning to focus or to focus and deflect an electron beam.

5. The image display device of claim 3, wherein the substrate is integrated into the vacuum container.

6. An image display device for forming images by causing a phosphor layer to emit light with electrons emitted from electron-emitting elements, the image display device comprising:
    a vacuum container;
    a phosphor layer;
    an anode wiring contacting the phosphor layer;
    a substrate provided with a cathode wiring made of a patterned conductor; and
    electron-emitting elements made by
        applying, to predetermined positions of the substrate, a carbon ink made into a paste with an organic binder and a solvent, the ink comprising (i) carbon particle having a 6-membered carbon ring, and (ii) support particles for supporting the carbon particles, and
        firing the ink; wherein the support particles are made of powder that decomposes into a gas when heated or burned, and
        wherein the decomposition temperature of the support particles is lower than the decomposition temperature of the organic binder; and
    wherein the cathode wiring is patterned into stripes;
    the phosphor layer has electrically separated stripes that are arranged in plane substantially parallel to the stripes of the cathode wiring and extend substantially perpendicular to the stripes of the cathode wiring; and the image display device is matrix-driven between the stripes of the phosphor layer and the stripes of the cathode wiring.

7. The image display device of claim 6, wherein the substrate is integrated into the vacuum container.

8. An image display device for forming images by causing a phosphor layer to emit light with electrons emitted from electron-emitting elements, the image display device comprising:

a vacuum container;

a phosphor layer;

an anode wiring contacting the phosphor layer;

a substrate provided with a cathode wiring made of a patterned conductor;

electron-emitting elements made by applying, to predetermined positions of the substrate, a carbon ink made into a paste with an organic binder and a solvent, the ink comprising (i) carbon particle having a 6-membered carbon ring, and (ii) support particles for supporting the carbon particles, and firing the ink; wherein the support particles are made of powder that decomposes into a gas when heated or burned, and wherein the decomposition temperature of the support particles is lower than the decomposition temperature of the organic binder, and wherein the cathode wiring is patterned into stripes; and gate electrodes arranged between the phosphor layer and the substrate;

wherein the cathode wiring is patterned into stripes;

the gate electrodes have electrically separated stripes that are arranged in a plane substantially parallel to the stripes of the cathode wiring and extend substantially perpendicular to the stripes of the cathode wiring; and the image display device is matrix-driven between the stripes of the phosphor layer and the stripes of the cathode wiring.

9. The image display device of claim 8, further comprising control electrodes between the phosphor layer and the gate electrodes, the control electrodes functioning to focus or to focus and deflect an electron beam.

10. The image display device of claim 8, wherein the substrate is integrated into the vacuum container.

* * * * *